(12) United States Patent
Melfi

(10) Patent No.: US 9,166,456 B2
(45) Date of Patent: Oct. 20, 2015

(54) SYSTEM AND METHOD TO ALLOW A SYNCHRONOUS MOTOR TO SUCCESSFULLY SYNCHRONIZE WITH LOADS THAT HAVE HIGH INERTIA AND/OR HIGH TORQUE

(75) Inventor: Michael J. Melfi, Richfield, OH (US)

(73) Assignee: Baldor Electric Company, Fort Smith, AR (US)

( * ) Notice: Subject to any disclaimer, the term of this patent is extended or adjusted under 35 U.S.C. 154(b) by 232 days.

(21) Appl. No.: 13/432,237

(22) Filed: Mar. 28, 2012

(65) Prior Publication Data

US 2013/0257342 A1    Oct. 3, 2013

Related U.S. Application Data

(60) Provisional application No. 61/614,140, filed on Mar. 22, 2012.

(51) Int. Cl.
| | | |
|---|---|---|
| H02P 6/00 | (2006.01) |
| F16D 27/00 | (2006.01) |
| B22D 19/00 | (2006.01) |
| H02K 7/00 | (2006.01) |

(52) U.S. Cl.
CPC ..................... *H02K 7/003* (2013.01)

(58) Field of Classification Search
USPC ........................... 318/705; 192/21.5; 164/109
See application file for complete search history.

(56) References Cited

U.S. PATENT DOCUMENTS

| | | | | |
|---|---|---|---|---|
| 2,895,580 | A | * | 7/1959 | Badin .......................... 192/58.1 |
| 4,120,388 | A |   | 10/1978 | Nisley |
| 4,967,887 | A | * | 11/1990 | Annacchino et al. ........ 192/21.5 |
| 5,758,709 | A | * | 6/1998 | Boyd, Jr. ....................... 164/109 |
| 7,422,543 | B2 |  | 9/2008 | Ransbarger et al. |
| 2004/0035684 | A1 | * | 2/2004 | Fukuoka ....................... 198/788 |

OTHER PUBLICATIONS

International Search Report and Written Opinion for PCT/US2013/032790 dated Jun. 4, 2013.

\* cited by examiner

*Primary Examiner* — Eduardo Colon Santana
*Assistant Examiner* — Gabriel Agared
(74) *Attorney, Agent, or Firm* — Thompson Coburn LLP

(57) ABSTRACT

A mechanical soft-start type coupling is used as an interface between a line start, synchronous motor and a heavy load to enable the synchronous motor to bring the heavy load up to or near synchronous speed. The soft-start coupling effectively isolates the synchronous motor from the load for enough time to enable the synchronous motor to come up to full speed. The soft-start coupling then brings the load up to or near synchronous speed.

22 Claims, 7 Drawing Sheets

SYSTEM AND METHOD TO ALLOW A SYNCHRONOUS MOTOR TO SUCCESSFULLY SYNCHRONIZE WITH LOADS THAT HAVE HIGH INERTIA AND/OR HIGH TORQUE

STATEMENT REGARDING FEDERALLY SPONSORED RESEARCH OR DEVELOPMENT

This invention was made with Government support under agreement no. DE→FG36-08GO180132 awarded by the Department of Energy. The Government has certain rights in this invention.

RELATED APPLICATION DATA

This application claims the benefit of provisional application Ser. No. 61/614,140, filed Mar. 22, 2012, the disclosure of which is incorporated by reference herein.

BACKGROUND

Synchronous motors, including permanent magnet motors and line-start permanent magnet motors, are typically very efficient. However, synchronous motors have limited capability to pull into synchronism loads that have a high torque or high inertia. Accordingly, the benefits in efficiency gains and energy savings ordinarily associated with synchronous motors are not typically achieved in applications having loads with high inertia and/or high torque characteristics. In the past, an inverter has been used with synchronous motors in such applications to power the motor during starting. However, an inverter adds substantial costs and degrades system efficiency.

To achieve the benefits of efficiency provided by synchronous motors, for instance, permanent magnet line-start motors, a mechanical soft-start coupling may be used as an interface between the synchronous motor and a high inertia and/or high torque load to enable the synchronous motor to bring the load up to or near synchronous speed. The soft-start coupling effectively isolates the synchronous motor from the high inertia and/or high torque load for enough time to enable the synchronous motor to come up to full synchronous speed. The soft-start coupling then brings the load up to or near synchronous speed. In the case of a lockingtype of soft-start coupling, the load speed will eventually be the same as the speed of the synchronous motor. For the case of a soft-start coupling that continues to slip even at steady state, the load speed will only approach but not equal the motor speed. As described below, a synchronous motor with a soft start coupling may be started directly across a polyphase power system and provide a dramatic reduction in noise and mechanical stress during the starting process due to a great reduction in torque ripple transmitted to the driven load. The soft-start coupling enables rapid acceleration of the motor by isolating the load from the motor temporarily until the motor comes up to synchronous speed.

DESCRIPTION OF THE DISCLOSED EMBODIMENTS

Soft-start couplings are known in the art. For instance, U.S. Pat. Nos. 2,895,580 and 4,120,388 both describe mechanical soft-start type couplings. One type of mechanical soft-start coupling that has proved effective is available from Baldor Electric Company and is sold under the trademark Flexidyne. However, other types of soft-start couplings may be used. For instance, fluid-based soft start couplings may be used, including couplings using magneto-rheological fluid. Additionally, soft start couplings with and without a lock-up feature may be used. The description that follows is not intended to be limiting in any sense, and is used for purposes of illustration only.

Figure 1:
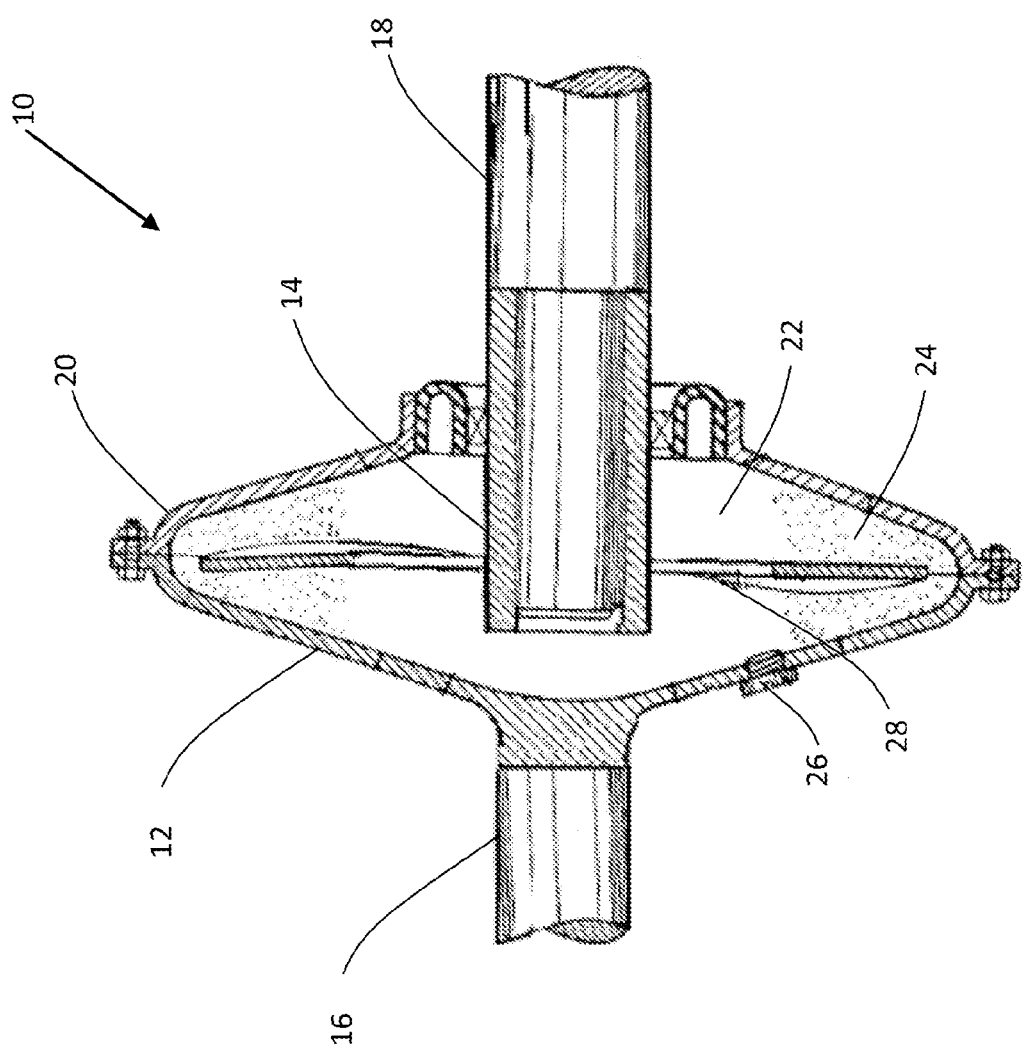
FIG. 1 shows an exemplary soft-start coupling.

FIG. 1 shows an exemplary soft-start coupling 10. Specific details of the construction of the soft-start coupling have been omitted for purposes of illustrating the principles of operation of the soft-start coupling. Generally speaking, a soft-start coupling 10 typically comprises a housing 12 and a hub 14. The housing 12 is typically operatively connected to a driving shaft 16 and the hub is typically operatively connected to a driven shaft 18. The housing 12 has a generally tapered cross section becoming narrow at its periphery 20. The housing 12 has a hollow interior 22 which is partially filled with a dry fluid 24, for instance, steel shot. An access 26 may be provided in the housing to allow introducing or removing dry fluid from the housing interior 22. In the housing interior, there is a rotor 28 comprising a circular disk-like element connected to the hub 14. During operation, the dry fluid 24 in the housing interior 22 is thrown around toward the outer periphery 20 of the housing 12 by centrifugal force and contacts the rotor 28. As the drive shaft 16 and housing 12 accelerate in rotation, the dry fluid 24 initially permits slippage and relative rotation between the housing and the rotor 28 and the hub 14. As the rotation approaches synchronous speed, the dry fluid 24 forms a virtually solid mass packed between the internal walls of the housing and the rotor 28, thereby effectively locking the components together. Thus, the slippage which occurs during the initial stages of starting the motor produces a smooth acceleration without placing an abrupt load on the motor or equipment. The formation of the solid mass as the hub approaches synchronous speed results in freedom of slippage, giving an operating efficiency and a transmission of power from the drive shaft 16 to the driven shaft 18 of approximately 100 percent. The amount of dry fluid 24 in the housing interior 22 may be adjusted to accommodate a desired amount of slippage or acceleration between the driving and driven shafts 16,18. Longer acceleration times will occur when less dry fluid is used and faster acceleration, from stop to full speed, will be observed with greater amounts of dry fluid levels.

The soft start coupling may be provided to sufficiently dissipate heat generated while the load is brought up to synchronous or near synchronous speed. Use of the soft start coupling enables heat otherwise generated in the motor during starting to be transferred to the soft start coupling where generated heat may be dissipated without causing detrimental effects in the motor, for instance, demagnetization of permanent magnet rotor components. The amount of fill material, the type of soft start coupling, and the ratings of the soft start coupling are among criteria that may be considered in selecting a soft start coupling for an application where heat generation, particularly, in the motor, is a concern.

During testing involving a synchronous motor having limited or no ability to synchronize a load having high torque or heavy inertia characteristics, a soft start coupling was provided on the output shaft of the motor to couple the load to the motor. During testing, the synchronous motor was able to come up to synchronous speed and eventually drive the high inertia/high torque load at or near synchronous speed. Accordingly, through the use of the soft-start coupling, the energy efficiency provided by a synchronous motor may be used to drive high inertia/high torque loads that the synchronous motor might not otherwise drive. In this way, the synchronous motor may replace induction motors previously used for such loads, and result in an increase in efficiency of the system without the need to add additional components that may contribute to overall system losses.

Example 1

Figure 4:
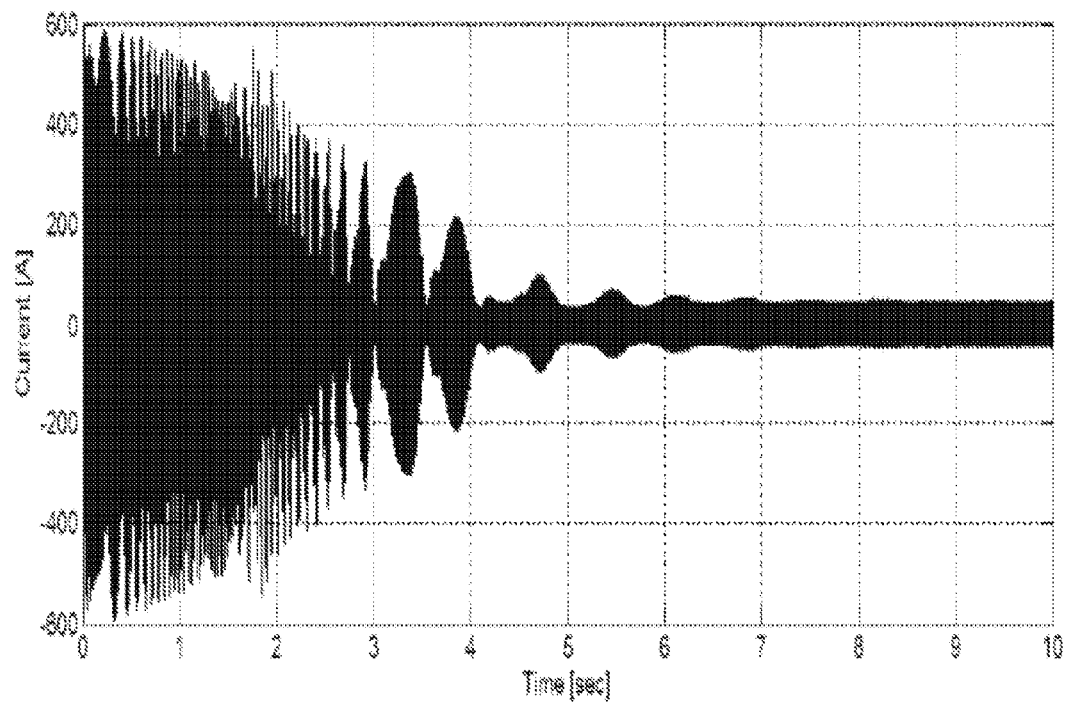
FIG. 4 shows a graph showing current drawn over time during starting by a 50 horse power permanent magnet synchronous motor coupled to a load having 144 lb-ft$^2$ of inertia and 100 Nm of torque without a soft-start coupling.

FIG. 4 is a graph showing current drawn over time during starting by a 50 horse power permanent magnet synchronous motor coupled to a load having 144 lb-ft$^2$ of inertia and 100 Nm of torque without a soft-start coupling.

Example 2

Figure 5:
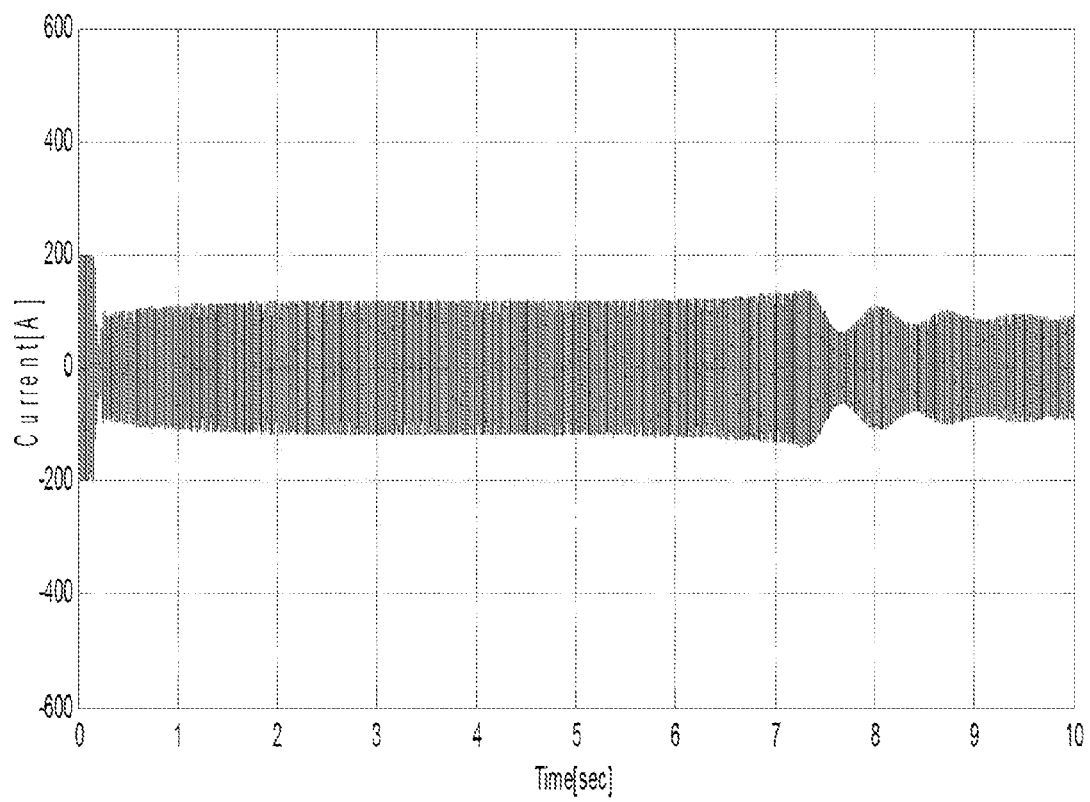
FIG. 5 shows a graph showing current drawn over time during starting by a 50 horse power permanent magnet synchronous motor coupled to a load with a soft-start coupling. The load has 144 lb-ft$^2$ of inertia and requires 200 Nm of torque.

FIG. 5 is a graph showing current drawn over time during starting by a 50 horse power permanent magnet synchronous motor coupled to a load with a soft-start coupling. The load has 144 lb-ft$^2$ of inertia and requires 200 Nm of torque.

The motor, and for that matter load, of Example 2 would not have achieved synchronous or near synchronous speed without the use of the soft-start coupling. In Example 2, the overall starting current drawn over the 10 second period displayed is significantly less than that of Example 1, and the current transients experienced by the motor in as shown in Example 1 are significantly reduced through the use of the soft start coupling as shown in Example 2. The motor of Example 2 was able to attain synchronous speed upon starting and maintain synchronous speed during normal steady state operation. The motor of Example 2 was able to bring the load from start to synchronous speed while maintaining motor speed synchronous with the line power. The motor of Example 1 achieved synchronous speed after approximately 4 seconds and steady state normal operation after 7 seconds.

Example 3

Figure 6:
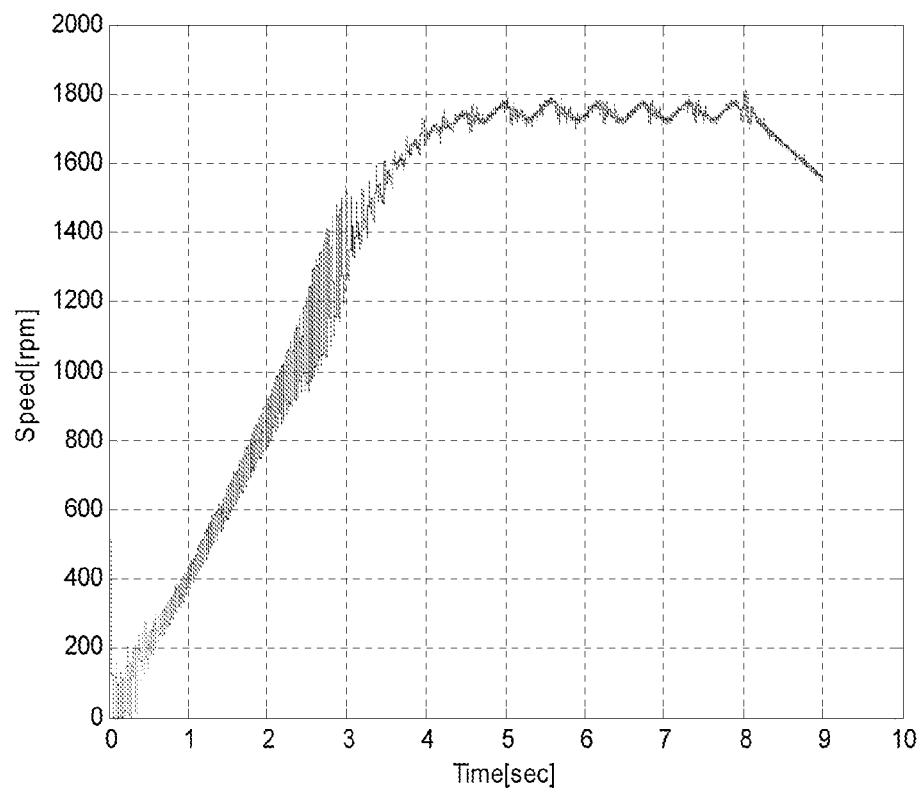
FIG. 6 shows a graph of motor speed versus time during starting. The motor is a 50 horse power permanent magnet synchronous motor coupled to a load without a soft-start coupling. The load has 144 lb-ft$^2$ of inertia and 125 Nm of torque.

FIG. 6 is a graph of motor speed versus time during starting. The motor is a 50 horse power permanent magnet synchronous motor coupled to a load without a soft-start coupling. The load has 144 lb-ft$^2$ of inertia and 125 Nm of torque.

The continuing speed oscillations beginning at 5 seconds and continuing throughout the display evidence the inability of the motor to synchronize the load with these torque and inertia characteristics. The motor was also not able to attain synchronous speed nearly immediately after start-up when loaded with a load having these torque and inertia characteristics. While the motor of Example 1 was able to attain synchronous speed and bring the load (144 lb-ft$^2$ inertia, 100 Nm torque) up to synchronous or near synchronous speed after a period of seconds, the motor of Example 3 (144-ft$^2$ inertia, 125 Nm torque) could not. On the other hand, the motor of Example 2 and the soft-start coupling was able to attain synchronous speed nearly immediately upon starting and maintain synchronous speed during normal steady state operation with the load at synchronous or near synchronous speed.

Example 4

Figure 7:
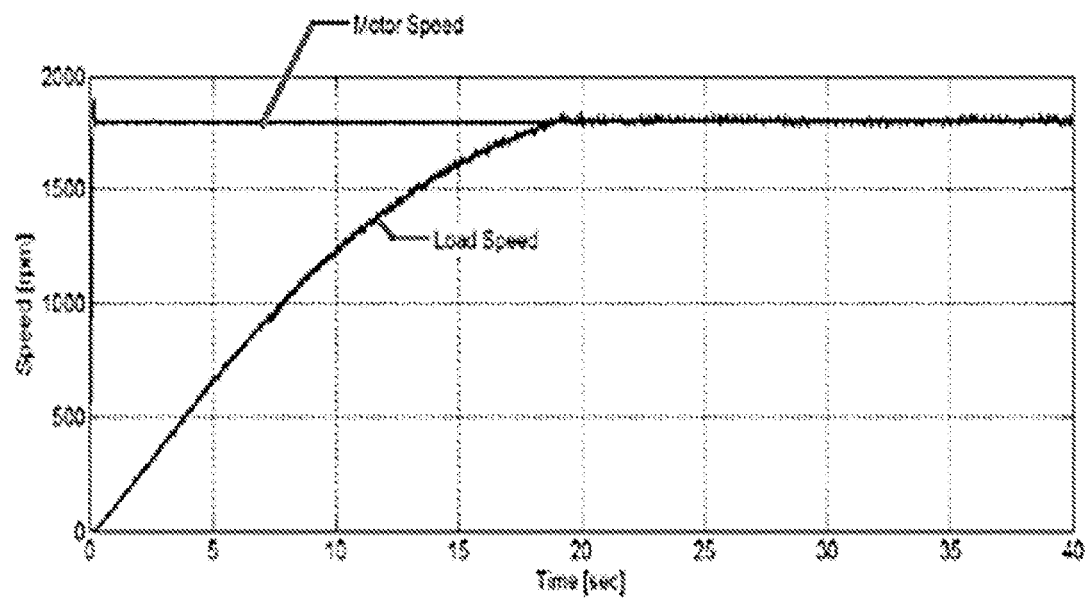
FIG. 7 shows a graph of motor speed versus time during starting. The motor is a 50 hp permanent magnet synchronous motor coupled to a load with a soft-start coupling. The load has 360 lb-ft$^2$ of inertia and 200 Nm of torque.

FIG. 7 is a graph of motor speed versus time during starting. The motor is a 50 hp permanent magnet synchronous motor coupled to a load with a soft-start coupling. The load has 360 lb-ft$^2$ of inertia and 200 Nm of torque.

Example 4 shows the use of the soft-start coupling enabling an extremely fast synchronization of a permanent magnet synchronous motor which can then synchronize with a high inertia/high torque load. The motor of Example 4 would not have been able to bring the load to synchronous or near synchronous speed without the use of the soft start coupling. The motor nearly immediately after start-up attained synchronous speed when loaded with a load having these inertia and torque characteristics. The motor was also able to maintain synchronous speed during normal steady state operation when loaded with a load having these inertia and torque characteristics.

Figure 2:
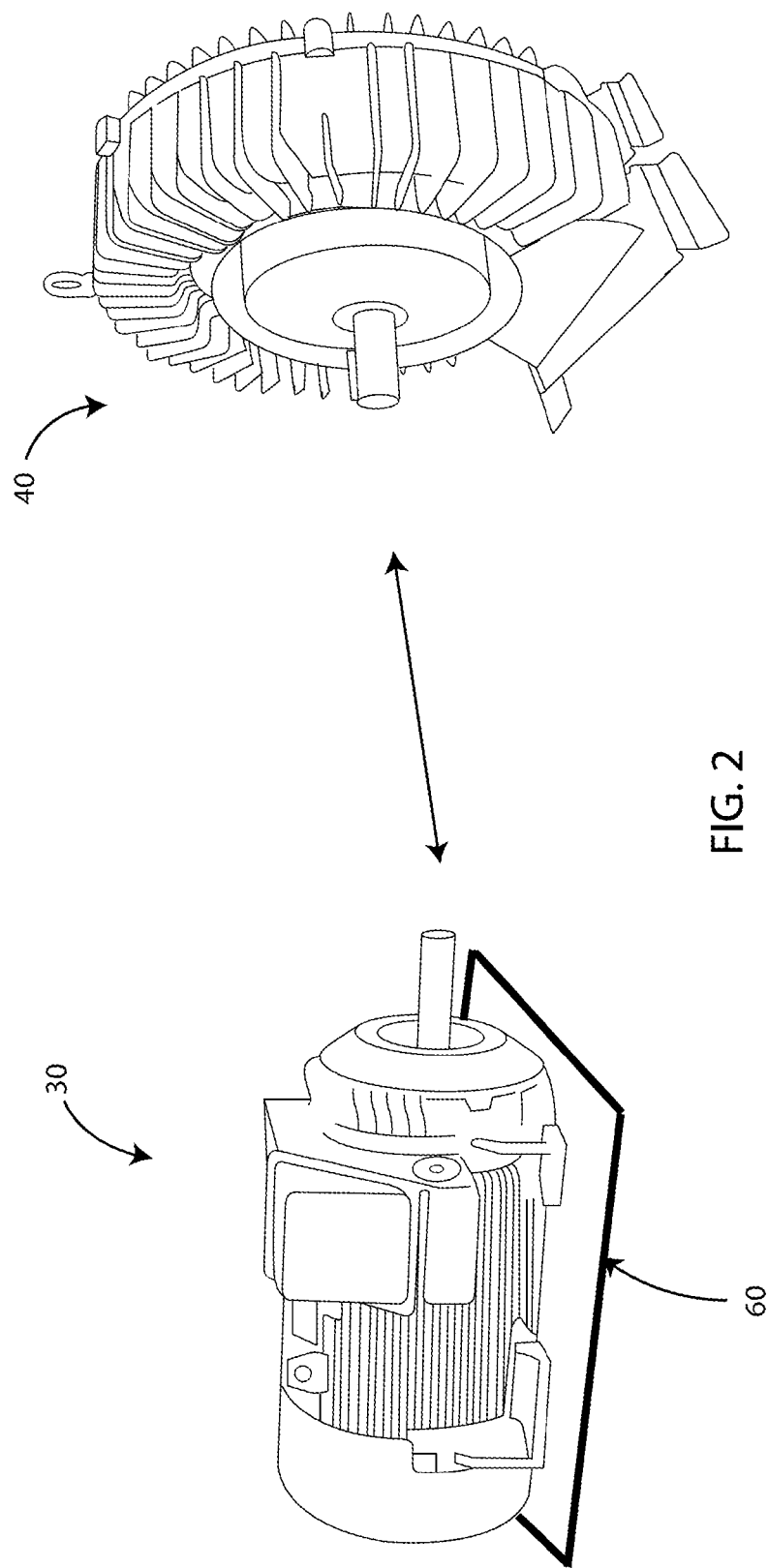
FIG. 2 shows an arrangement involving an induction motor and a high torque/high inertia load.

FIG. 2 shows a typical application involving an induction motor 30 and a high torque/high inertia load 40. Induction motors 30 are typically used in such applications due to their lower cost, simpler construction, and ability to generate high torque at low speeds, for instance, during start-up.

Figure 3:
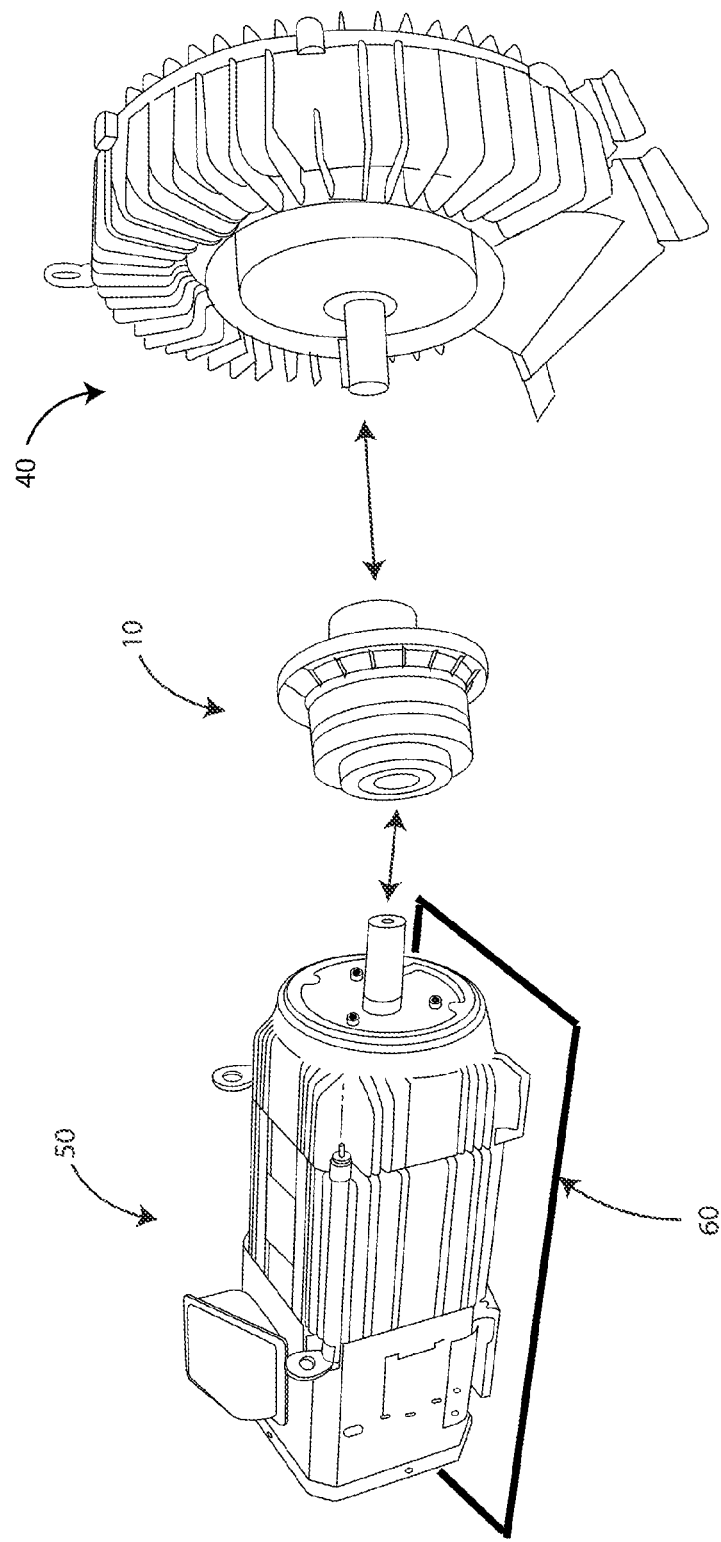
FIG. 3 shows an arrangement in which the induction motor has been replaced with a synchronous motor and the soft-start coupling.

FIG. 3 shows an application involving a synchronous motor 50 with a soft-start coupling 10 used to couple the synchronous motor to the load 40. Because of the potential savings through efficiency gains and thereby energy savings, the induction motor 30 of FIG. 2 may be replaced with the synchronous motor 50 of FIG. 3 and installed in the same footprint area 60 as the induction motor of FIG. 2. The synchronous motor 50 may be mounted to an existing structure in the footprint area 60 to which the induction motor 30 was mounted, preferably in the location where the induction motor was originally mounted, so that the shaft of the synchronous motor is sufficiently aligned to couple to the shaft of the load 40 through the soft start coupling 10. The amount of dry fluid in the soft-start coupling may then be set for a desired acceleration time for a given load. For instance, the level of dry fluid may be set so that the motor achieves synchronous speed when loaded with the load nearly instantaneously after starting of the motor. The level of dry fluid may be set so that the motor thereafter brings the load to synchronous speed. The level of dry fluid may also be set so that the load has no or minimal slip after the motor is operating at synchronous speed. To the extent, other types of soft-start couplings are used, they may be configured as necessary to set acceleration time for a given load. For instance, in a coupling using magneto-rheological fluid, the amount of fluid and applied magnetic field may be adjusted as necessary.

The use of the soft-start coupling to couple a high inertia/high torque load to a synchronous motor expands the capability and use of a line start synchronous motor to applications previously solely relegated to the use of induction motors. Thus, the efficiency and energy saving of synchronous motors may be achieved in a wide range of applications through the use of a soft start coupling.

While specific embodiments have been described in detail and in the foregoing detailed description and illustrated in the accompanied drawings, those with ordinary skill in the art will appreciate that various modifications and alternatives to those details could be developed in light of the overall teachings of the disclosure. Accordingly, the specific embodiments disclosed and particular ranges disclosed were meant to be illustrative only and not limited as to the scope of the invention, which is to be given the full breath of the appended claims and any and all equivalents thereof.

What is claimed is:

1. A method comprising:
   accessing a line-start synchronous motor;
   accessing a soft-start coupling; and
   operatively coupling the soft-start coupling to the synchronous motor and a load;
   wherein the load has characteristics sufficient to prevent obtaining normal synchronous operation of the motor when the motor is operatively connected to the load in the absence of the coupling being operatively connected to the motor shaft and the load; and
   wherein the synchronous motor is sufficiently rated to obtain synchronous operation and to drive the load at least near synchronous speed during normal steady state operation of the motor when the soft-start coupling is operatively connected to the motor shaft and the load;
   wherein the coupling comprises:
      a housing with a coupling center axis aligned with motor central axis, the coupling housing having an interior partially filled with a fluid, the fluid being one of magneto-rheological fluid and dry fluid, the housing having an opening aligned with the coupling center axis; and
      a hub having a center axis aligned with the coupling center axis, the hub having an extension portion extending along the hub center axis and through the coupling housing opening into the housing interior, the extension portion having a rotor assembly extending radially outward in the coupling housing interior for rotation within the coupling housing interior.

2. The method of claim 1, wherein the load has torque characteristics sufficient to prevent normal synchronous steady state operation of the motor in the absence of the coupling being operatively connected to the motor shaft.

3. The method of claim 1, wherein the load has inertia characteristics sufficient to prevent normal synchronous steady state operation of the motor in the absence of the coupling being operatively connected to the motor shaft.

4. The method of claim 1, wherein the soft start coupling has characteristics sufficient to dissipate a portion of an amount of heat generated by the motor during starting in the absence of the coupling being operatively connected to the motor shaft.

5. A method comprising:
   providing a line-start, synchronous motor;
   providing a soft-start coupling; and
   operatively coupling the soft-start coupling to the synchronous motor and a load;
   wherein the soft-start coupling allows the synchronous motor to attain synchronous speed nearly immediately after starting of the motor with the motor operatively connected to the load;
   wherein the load has characteristics sufficient to prevent normal starting including synchronization of the motor when the motor is operatively connected to the load in the absence of the coupling being operatively connected to the motor shaft and the load; and
   wherein the synchronous motor is sufficiently rated to obtain synchronous operation and to drive the load from start to at least near synchronous speed during normal steady state operation of the motor when the coupling is operatively connected to the motor shaft and the load;
   wherein the coupling comprises:
      a housing with a coupling center axis aligned with motor central axis, the coupling housing having an interior partially filled with a fluid, the fluid being one of magneto-rheological fluid and dry fluid, the housing having an opening aligned with the coupling center axis; and
      a hub having a center axis aligned with the coupling center axis, the hub having an extension portion extending along the hub center axis and through the coupling housing opening into the housing interior, the extension portion having a rotor assembly extending radially outward in the coupling housing interior for rotation within the coupling housing interior.

6. The method of claim 5, wherein the load has torque characteristics sufficient to prevent normal start-up and synchronization of the motor in the absence of the coupling being operatively connected to the motor shaft.

7. The method of claim 5, wherein the load has inertia characteristics sufficient to prevent normal start-up and synchronization of the motor in the absence of the coupling being operatively connected to the motor shaft.

8. The method of claim 5, wherein the soft-start coupling comprises a lock-up feature.

9. The method of claim 5, wherein the coupling is a mechanical soft-start coupling partially filled with a dry fluid.

10. The method of claim 9, wherein the
    coupling housing is operatively connected to the motor shaft; and
    the hub is operatively connected to the load.

11. The method of claim 5 further comprising selecting an amount of dry fluid for the coupling housing interior sufficient to enable the motor to achieve synchronous speed when loaded with the load nearly instantaneously after starting of the motor.

12. The method of claim 11 wherein selecting an amount of dry fluid for the coupling housing interior includes selecting an amount of dry fluid sufficient to bring the load to synchronous speed.

13. The method of claim 5 further comprising removing an induction motor from the load before operatively connecting the coupling to the motor shaft.

14. The method of claim 13 further comprising configuring mounts of the synchronous motor to allow mounting of the synchronous motor in the induction motor's pre-removal location.

15. The method of claim 5, wherein the soft start coupling has characteristics sufficient to dissipate a portion of an amount of heat generated by the motor during starting in the absence of the coupling being operatively connected to the motor shaft.

16. A method comprising:
providing a line-start permanent magnet synchronous motor;
providing a coupling comprising:
a coupling housing with a coupling center axis aligned with a motor central axis, the coupling housing having an axial cross-section that tapers toward a periphery of the coupling housing, the housing having an interior partially filled with a dry fluid, the housing having an opening aligned with the coupling center axis;
a hub having a center axis aligned with the coupling center axis, the hub having an extension portion extending along the hub center axis and through the coupling housing opening into the housing interior, the extension portion having a rotor assembly extending radially outward in the coupling housing interior for rotation within the coupling housing interior, and
operatively connecting the coupling housing to a shaft of the motor; and
operatively connecting the coupling to a load:
wherein the load is sufficient to prevent the motor from immediately attaining synchronous speed after starting of the motor in the absence of the coupling being operatively connected to the motor shaft; and
wherein the synchronous motor is sufficiently rated to obtain synchronous operation and to drive the load from start to at least near synchronous speed during normal steady state operation of the motor when the coupling is operatively connected to the motor shaft and the load.

17. The method of claim 16 further comprising removing an induction motor from the load before operatively connecting the coupling housing to the motor shaft.

18. The method of claim 17 further comprising configuring mounts of the synchronous motor to allow mounting of the synchronous motor in the induction motor's pre-removal location.

19. The method of claim 16 further comprising inserting an amount of dry fluid in the coupling housing interior sufficient to enable the motor to achieve synchronous speed.

20. The method of claim 16 further comprising inserting an amount of dry fluid in the coupling housing interior sufficient to bring the load up to synchronous speed.

21. The method of claim 16 wherein the soft-start coupling has a lock-up feature.

22. The method of claim 16, wherein the soft start coupling has characteristics sufficient to dissipate a portion of an amount of heat generated by the motor during starting in the absence of the coupling being operatively connected to the motor shaft.

* * * * *